(12) United States Patent
Maeda et al.

(10) Patent No.: US 11,400,369 B2
(45) Date of Patent: *Aug. 2, 2022

(54) NON-TRANSITORY COMPUTER READABLE RECORDING MEDIUM, GAME SERVER, AND CONTROL METHOD

(71) Applicant: GREE, INC., Tokyo (JP)

(72) Inventors: Masahito Maeda, Tokyo (JP); Yasushi Mikawa, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,828

(22) Filed: Jan. 14, 2021

(65) Prior Publication Data

US 2021/0129022 A1    May 6, 2021

Related U.S. Application Data

(63) Continuation of application No. 16/403,032, filed on May 3, 2019, now Pat. No. 10,918,942, which is a
(Continued)

(30) Foreign Application Priority Data

Jul. 31, 2013   (JP) ................................ 2013-158440
Mar. 5, 2014   (JP) ................................ 2014-042978

(51) Int. Cl.
*A63F 13/422*    (2014.01)
*A63F 13/833*    (2014.01)
(Continued)

(52) U.S. Cl.
CPC ............ *A63F 13/422* (2014.09); *A63F 13/25* (2014.09); *A63F 13/35* (2014.09);
(Continued)

(58) Field of Classification Search
USPC ........................................................ 463/31
See application file for complete search history.

(56) References Cited

U.S. PATENT DOCUMENTS 7,971,226 B2 *  6/2011  Alfaro ..................... A63F 13/10
                                                                463/43
2004/0198497 A1 * 10/2004 Yamashita .............. A63F 13/12
                                                                463/43
(Continued)

FOREIGN PATENT DOCUMENTS

JP    2001-300143 A    10/2001
JP    2004-159887 A     6/2004
(Continued)

OTHER PUBLICATIONS

"Institution of Post-Grant Review" filed in PGR2018-00039 on Sep. 13, 2018.
(Continued)

*Primary Examiner* — Pierre E Elisca
(74) *Attorney, Agent, or Firm* — Oliff PLC

(57) ABSTRACT

A non-transitory computer readable recording medium having stored thereon instructions to be executed on by a game server, the game server and corresponding method which cause the game server to perform the steps of: provide a networked multiplayer battle game over a network, storing a battle history including an identifier of an opponent with whom a user has battled in the multiplayer battle game; determining, based on the battle history and an identifier of an opponent with whom a battle begins, a procedure for conducting the battle in the battle game to be one of a first mode for conducting the battle based on user operations and a second mode for conducting the battle with fewer user operations than in the first mode, and conducting the battle with the determined procedure.

18 Claims, 11 Drawing Sheets

Related U.S. Application Data continuation of application No. 15/938,681, filed on Mar. 28, 2018, now Pat. No. 10,322,340, which is a continuation of application No. 15/582,134, filed on Apr. 28, 2017, now Pat. No. 9,956,484, which is a continuation of application No. 15/265,441, filed on Sep. 14, 2016, now Pat. No. 9,669,308, which is a continuation of application No. 14/445,652, filed on Jul. 29, 2014, now Pat. No. 9,468,849.

(51) Int. Cl.
| | | |
|---|---|---|
| *A63F 13/5375* | (2014.01) | |
| *A63F 13/79* | (2014.01) | |
| *A63F 13/25* | (2014.01) | |
| *A63F 13/35* | (2014.01) | |
| *A63F 13/822* | (2014.01) | |

(52) U.S. Cl.
CPC .......... *A63F 13/5375* (2014.09); *A63F 13/79* (2014.09); *A63F 13/822* (2014.09); *A63F 13/833* (2014.09)

(56) References Cited

U.S. PATENT DOCUMENTS

| | | | | |
|---|---|---|---|---|
| 2004/0198498 | A1* | 10/2004 | Yamashita | A63F 13/87 463/43 |
| 2006/0223599 | A1* | 10/2006 | Alfaro | A63F 13/10 463/1 |
| 2012/0034981 | A1 | 2/2012 | Yamaguchi | |
| 2018/0178126 | A1* | 6/2018 | Takahashi | A63F 13/95 |

FOREIGN PATENT DOCUMENTS

| | | | |
|---|---|---|---|
| JP | 2005-318987 | A | 11/2005 |
| JP | 2006-279814 | A | 10/2006 |
| JP | 2007-075612 | A | 3/2007 |
| JP | 2011-239937 | A | 12/2011 |
| JP | 2012-034822 | A | 2/2012 |
| JP | 2015-057117 | A | 3/2015 |

OTHER PUBLICATIONS

"Patent Owner's Request for Rehearing" filed in PGR2018-00039 on Sep. 26, 2018.
"Decision on Request for Rehearing" issued in PGR2018-00039 on Oct. 26, 2018.
Nov. 20, 2018 Office Action issued in Japanese Application No. 2017-253687.
"Patent Owner's Contingent Motion to Amend" filed in PGR2018-00039 on Dec. 13, 2018.
"Patent Owner's Response" filed in PGR2018-00039 on Dec. 13, 2018.
"Petitioner's Reply to Patent Owner's Response" filed in PGR2018-00039 on Mar. 14, 2019.
Exhibit 1011 (RPG Fan Webpage: Record of Agarest War, Jul. 17, 2010, Patrick Gann) filed in PGR2018-00039 on Mar. 14, 2019.
Exhibit 1010 (Deposition Transcript of Michael Zyda) filed in PGR2018-00039 on Mar. 14, 2019.
Exhibit 1012 (Microsoft Computer Dictionary, 4th Ed. (1999), "execute" and "procedure") filed in PGR2018-00039 on Mar. 14, 2019.
Exhibit 1013 (2019 Revised Patent Subject Matter Eligibility Guidance) filed in PGR2018-00039 on Mar. 14, 2019.
"Petitioner's Opposition to Motion to Amend" filed in PGR2018-00039 on Mar. 14, 2019.
"Patent Owner's Objection to Evidence" filed in PGR2018-00039 on Mar. 21, 2019.
"Patent Owner's Reply to Opposition to Motion to Amend" filed in PGR2018-00039 on Apr. 15, 2019.
"Ex. 2006" filed in PGR2018-00039 on Apr. 15, 2019.
"Patent Owner's Sur-Reply" filed in PGR2018-00039 on Apr. 15, 2019.
Jun. 25, 2019 Notice of Reasons for Refusal issued in Japanese Patent Application No. 2017-253687.
"Final Written Decision" issued in PGR2018-00039 dated Sep. 6, 2019.
"Conduct of the Proceeding/Errata" issued in PGR2018-00039 on Oct. 2, 2019.
"Record of Oral Hearing Held Jun. 20, 2019" filed in PGR2018-00039 on Jun. 20, 2019.
"Exhibit 1015 (Petitioner's Demonstrative)" filed in PGR2018-00039 on Jun. 18, 2019.
"Patent Owner's Demonstrative Exhibits" filed in PGR2018-00039 on Jun. 18, 2019.
"Patent Owner's Reply to Opposition to Motion to Exclude Evidence" filed in PGR2018-00039 on May 28, 2019.
"Errata" filed in PGR2018-00039 on May 21, 2019.
"Petitioner's Opposition to Patent Owner's Motion to Exclude Evidence Pursuant to 37 C.F.R. Section 42.64(c)" filed in PGR2018-00039 on May 21, 2019.
"Patent Owner's Motion to Exclude Evidence" filed in PGR2018-00039 on May 14, 2019.
"Petitioner's Sur-Reply to Opposition to Patent Owners Motion to Amend" filed in PGR2018-00039 on May 14, 2019.
"Exhibit 2007 (Declaration of Apriljoy H. Sanchez in Response to Patent Owner's Objections to Evidence)" filed in PGR2018-00039 on May 14, 2019.
Sep. 6, 2019 Final Written Decision issued in PGR 2018-00039.
Nov. 8, 2019 Petitioner's Notice of Appeal filed in PGR 2018-00039.
Jan. 14, 2020 Decision of Refusal issued in Japanese Patent Application No. 2017-253687.
Jan. 14, 2020 Decision of Dismissal of Amendment issued in Japanese Patent Application No. 2017-253687.
Jun. 8, 2020 Office Action Issued in U.S. Appl. No. 16/403,032.
Aug. 4, 2020 Notice of Allowance Issued in U.S. Appl. No. 16/403,032.
Apr. 5, 2018 Reconsideration Report by Examiner Before Appeal issued in Japanese Patent Application No. 2014-238954.
Oct. 14, 2020 Notice of Allowance Issued in U.S. Appl. No. 16/403,032.
Mar. 30, 2021 Office Action issued in Japanese Patent Application No. 2020-071782.
Terasan1108, "StreetPass battle function in Super Street Fighter IV: 3D Edition," [online], Oct. 22, 2011, Rakuten, Inc., Rakuten blog, [searched on Mar. 11, 2021], https://plaza.rakuten.co.jp/diyman/diary/201109060000/.
Jikkyo Pawafuru Pro-Yakyu (Play-by-Play Powerful Baseball) Portable 4, Dengeki PlayStation (Impulsive PlayStation), Aschi Media Works Inc., Sep. 25, 2009, vol. 15, No. 35, pp. 152-157.
Boku no Natsuyasumi Portable 2 Nazonazo Shimai to Chinbotsusen no Himitsu ! (My Summer Vacation Protable 2 Riddle Sisters and the Secret of Sunken Ship!), Weekly Famitsu, Enterbrain, Inc., Jun. 24, 2010, vol. 25. No. 27, pp. 64-71.
Gloria Union, Official Complete Guide, Softbank Creative Corp. Aug. 5, 2011, First ed., pp. 006-007.
Jul. 21, 2015 Office Action issued in Japanese Application No. 2014-042978.
Nov. 17, 2015 Office Action issued in Japanese Application No. 2014-42978.
"Regarding Battle Mode," Keibunsha no daihyakka bessatsu. Super Nintendo Entertainment System: Winning Strategy Special Report. Dragon Slayer, The Legend of Heroes II, Keibunsha Co. Ltd., Dec. 21, 1998, pp. 18-19.
"Dokapon the World," Official Guidebook, Softbank Publishing Co. Ltd., Dec. 3, 2004, First ed., pp. 005-006, 011-013.
"Build a more professional baseball team! Perfect Guide," Softbank Publishing Co. Ltd., Nov. 6, 2000, First ed., p. 098.
"Age of Wonders II—The throne of wizard-," Japanese version, DOS/VPOWR Report vol. 13, No. 4, Japan, Impress Corporation, Apr. 1, 2003, vol. 13/No. 4, p. 194.

(56) References Cited

OTHER PUBLICATIONS

"Live broadcasting powerful professional baseball," portable 4, Dengeki PlayStation, Ascii Media Works Inc., Sep. 25, 2009, vol. 15, No. 35, p. 152-157.
Aug. 26, 2014 Office Action issued in Japanese Application No. 2014-042978.
Apr. 22, 2014 Office Action issued in Japanese Application No. 2014-042978.
Oct. 28, 2016 Office Action issued in U.S. Appl. No. 15/265,441.
Sep. 27, 2016 Office Action issued in Japanese Application No. 2014-238954.
"SD Gundam G-Generation Spirits Final Complete Guide", First Edition, Enterbrain, Inc., Feb. 22, 2008, p. 030, 044, 054, 192.
Feb. 14, 2017 Office Action issued in Japanese Application No. 2014-238954.
May 23, 2017 Office Action issued in Japanese Application No. 2014-238954.
"Magical Dice Kids", Sony Computer Entertainment Inc., "National Center for Industrial Property Information", Aug. 7, 2000 acceptance, a p. 16.
The atelier eternal mana of iris, an "electric shock PS2 electric-shock PlayStation 6/25 special-number item", and media—a works, Jun. 25, 2004, the 10th vol. No. 14, and p. 42-43.
Sep. 1, 2017 Office Action issued in U.S. Appl. No. 15/582,134.
Oct. 10, 2017 Decision to Decline the Amendment issued in Japanese Application No. 2014-238954.
Oct. 10, 2017 Decision of Refusal issued in Japanese Application No. 2014-238954.
Dengeki Nintendo DS, "HIGH0SPEED Card Battle: Card Hero", Mediaworks, vol. 8, No. 1, pp. 122-123, Jan. 1, 2008.
Dengeki Playstation vol. 530, "Puzzle and Dragons". Ascii Mediaworks, vol. 18, No. 34, p. 218, Nov. 8, 2012.
Feb. 3, 2015 Report of Reconsideration by Examiner before Appeal issued in Japanese Application No. 2014-042978.
Degeki Game Application. "Hidden Treasure Detective", Ascii Media Works, Inc., vol. 15, No. 19, pp. 108-109, Oct. 16, 2012.
Feb. 7, 2018 Notice of Allowance issued in U.S. Appl. No. 15/582,134.
Jun. 21, 2018 Office Action Issued in U.S. Appl. No. 15/938,681.
Mar. 5, 2018 Petition for Post Grant Review of U.S. Pat. No. 9,669,308.
Microsoft Computer Dictionary. Fourth Edition. Microsoft Press. Redmond, Washington 98052-6399. Microsoft Corporation Copyright 1999. p. 102.
Bahr, Robert W., Deputy Commissioner for Patent Examination Policy. "Recent Subject Matter Eligibility Decisions". USPTO Memorandum. May 19, 2016.
Bahr, Robert W., Deputy Commissioner for Patent Examination Policy. "Recent Subject Matter Eligibility Decisions". USPTO Memorandum. Nov. 2, 2016.
"Subject Matter Eligibility Examples: Business Methods." Dec. 2016.
"American Heritage Dictionary 93" filed in PGR2018-00039 on Jun. 21, 2018.
"American Heritage Dictionary 479" filed in PGR2018-00039 on Jun. 21, 2018.
"Apr. 19, 2018 USPTO Memo" filed in PGR2018-00039 on Jun. 21, 2018.
"Patent Owner Preliminary Response" filed in PGR2018-00039 on Jun. 21, 2018.
"Declaration of Michael Zyda" filed in PGR2018-00039 on Jun. 21, 2018.
"Exhibit A to Zyda Declaration" filed in PGR2018-00039 on Jun. 21, 2018.
"Part 1 of Exhibit B to Zyda Declaration" filed in PGR2018-00039 on Jun. 21, 2018.
"Part2 of Exhibit B to Zyda Declaration" filed in PGR2018-00039 on Jun. 21, 2018.
"Part 3 of Exhibit B to Zyda Declaration" filed in PGR2018-00039 on Jun. 21, 2018.
"Part 3.1 of Exhibit B to Zyda Declaration" filed in PGR2018-00039 on Jun. 21, 2018.
"Part 3.2 of Exhibit B to Zyda Declaration" filed in PGR2018-00039 on Jun. 21, 2018.
"Part 4.1 of Exhibit B to Zyda Declaration" filed in PGR2018-00039 on Jun. 21, 2018.
"Part 4.2 of Exhibit B to Zyda Declaration" filed in PGR2018-00039 on Jun. 21, 2018.
"Part 4.3 of Exhibit B to Zyda Declaration" filed in PGR2018-00039 on Jun. 21, 2018.
"Part 4.4 of Exhibit B to Zyda Declaration" filed in PGR2018-00039 on Jun. 21, 2018.
"Part 5 of Exhibit B to Zyda Declaration" filed in PGR2018-00039 on Jun. 21, 2018.
Nov. 2, 2021 Office Action issued in Japanese Patent Application No. 2020-071782.

\* cited by examiner

|  | User ID | |  |
|---|---|---|---|
|  | user001 | user002 | ... |
| Level | 25 | 13 | ... |
| Experience | 60% | 85% | ... |
| Maximum deck cost | 240 | 180 | ... |
| Money | 5000 | 2500 | ... |
| ... | ... | ... | ... |

| User ID | Deck | | | | |
|---|---|---|---|---|---|
| user001 | First card | Second card | Third card | Fourth card | ... |
| Card ID | card001 | card002 | card003 | card004 | ... |
| Level | 10 | 22 | 15 | 1 | ... |
| Experience | 10% | 80% | 25% | 20% | ... |
| Evolution | 1/3 | 1/2 | 2/2 | 2/4 | ... |
| Cost | 10 | 20 | 15 | 30 | ... |
| HP | 700 | 1000 | 800 | 2500 | ... |
| ATK | 1200 | 800 | 1000 | 4000 | ... |
| Command ID | cmd01 | cmd02 | cmd03 | cmd04 | ... |
| Command type | Attack | Recover | Assist | Attack | ... |
| Activation/recovery turns | 1/2 | 1/3 | 1/4 | 2/3 | ... |
| ... | ... | ... | ... | ... | ... |

|  |  | Enemy character ID | | |
|---|---|---|---|---|
|  |  | enemy001 | enemy002 | ... |
| Level | | 1 | 5 | ... |
| HP | | 1100 | 2500 | ... |
| ATK | | 700 | 1500 | ... |
| First command | Command ID | cmd91 | cmd92 | ... |
| | Command type | Attack | Attack | ... |
| | Activation/recovery turns | 1/4 | 1/3 | ... |
| Second command | Command ID | – | cmd93 | ... |
| | Command type | – | Recover | ... |
| | Activation/recovery turns | – | 1/4 | ... |
| ... | ... | ... | ... | ... |

|  |  | Opponent set | | | |
|---|---|---|---|---|---|
|  |  | set01 | set02 | set03 | ... |
| Enemy character ID of appearing enemy | First enemy character | enemy001 | enemy001 | enemy001 | ... |
| | Second enemy character | enemy001 | – | enemy002 | ... |
| | Third enemy character | enemy001 | – | – | ... |

|  | Battled opponent set | Win-loss information |
|---|---|---|
| user001 | set01 | Win |
|  | set02 | Win |
|  | set03 | Loss |
|  | ... | ... |
| user002 | set02 | Win |
|  | set03 | Loss |
|  | ... | ... |
| ... | ... | ... |

| Turn number | Acting character | Content of action |
|---|---|---|
| First turn | user001: | cmd01 |
|  |  | 1000 points of damage to enemy001a |
| Second turn | user001: | cmd04 |
|  |  | 2000 points of damage to enemy001a |
|  |  | Attack enemy001a |
|  | enemy001b: | cmd91 |
|  |  | 700 points of damage to user001 |
|  | enemy001c: | cmd91 |
|  |  | 700 points of damage to user001 |
| ... | ... | ... |

FIG. 6A

| Predicted result of battle | Displayed information |
|---|---|
| can win with no damage (remaining HP 100%) | "This one's a piece of cake!" |
| can win with remaining HP of at least 80% and less than 100% | "You can easily win!" |
| can win with remaining HP of at least 50% and less than 80% | "This opponent's somewhat strong." |
| can win with remaining HP of at least 1% and less than 50% | "This'll be a tough one." |
| can't win (remaining HP 0%) | "This is quite a tough opponent…" |

FIG. 6B

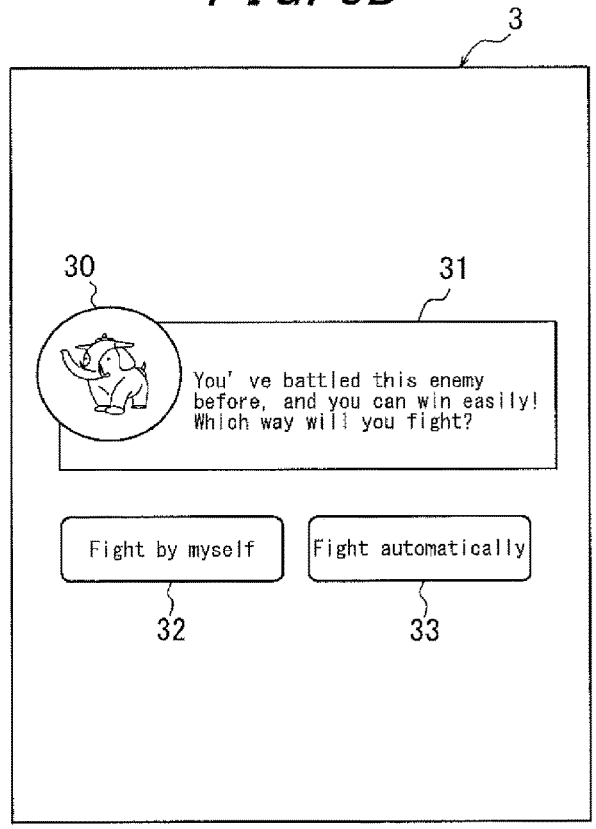

NON-TRANSITORY COMPUTER READABLE RECORDING MEDIUM, GAME SERVER, AND CONTROL METHOD

CROSS-REFERENCE TO RELATED APPLICATIONS

This is a Continuation of application Ser. No. 16/403,032 filed May 3, 2019, which is a Continuation of application Ser. No. 15/938,681 filed Mar. 28, 2018, which is a Continuation of Ser. No. 15/582,134 filed Apr. 28, 2017, which is a Continuation of application Ser. No. 15/265,441 filed Sep. 14, 2016, which is a Continuation of application Ser. No. 14/445,652 filed Jul. 29, 2014, which issued on Oct. 18, 2016 as U.S. Pat. No. 9,468,849, which claims priority to and the benefit of Japanese Patent Application No. 2013-158440 filed Jul. 31, 2013, and Japanese Patent Application No. 2014-42978 filed Mar. 5, 2014, the entire contents of which are incorporated herein by reference.

TECHNICAL FIELD

The present invention relates to a non-transitory computer readable recording medium, a game server, a game control method, and a game system.

BACKGROUND ART

As a video game using an information processing device such as a computer, a battle game has been proposed to allow a user to fight an opponent by controlling a player character in the game (for example, see Patent Literature 1). In such a battle game, a turn-based combat system is used, and the user battles by selecting a command during each turn to determine the action of the player character.

CITATION LIST

Patent Literature

Patent Literature 1: JP 2007-075612 A

SUMMARY OF INVENTION

Technical Problem

In a conventional battle game, however, during one battle, the user needs to select a command to determine the action of the player character many times, which may make operation troublesome.

The present invention has been conceived in light of the above circumstances, and it is an object thereof to provide a non-transitory computer readable recording medium, a game server, a game control method, and a game system that make the user operation in a battle game less troublesome.

Solution to Problem

A non-transitory computer readable recording medium according to the present invention for solving the above problems is a non-transitory computer readable recording medium having stored thereon instructions to be executed on a computer providing a battle game to a communication terminal, the instructions causing the computer to perform the steps of: storing a battle history including an identifier of an opponent with whom a user has battled in the battle game; determining, based on the battle history and on an identifier of an opponent with whom a battle begins, a procedure for conducting the battle in the battle game to be one of a first mode for conducting the battle based on user operations and a second mode for conducting the battle with fewer user operations than in the first mode; and conducting the battle with the determined procedure.

In the non-transitory computer readable recording medium according to the present invention, the instructions preferably further cause the computer to perform the steps of: when the identifier of the opponent with whom the battle begins matches the identifier of the opponent included in the battle history, causing the communication terminal to display a mode selection screen allowing the user to select between the first mode and the second mode; receiving a user operation via the mode selection screen; and determining the procedure for conducting the battle in accordance with the user operation that is received; and when the identifier of the opponent with whom the battle begins does not match the identifier of the opponent included in the battle history, determining the procedure for conducting the battle to be the first mode.

In the non-transitory computer readable recording medium according to the present invention, the battle history preferably further includes win-loss information on the user for each opponent with whom the user has battled, and the instructions preferably further cause the computer to perform the steps of: when the identifier of the opponent with whom the battle begins matches an identifier that is included in the battle history and that identifies an opponent against whom the user has won, causing the communication terminal to display a mode selection screen allowing the user to select between the first mode and the second mode; receiving a user operation via the mode selection screen; and determining the procedure for conducting the battle in accordance with the user operation that is received; and when the identifier of the opponent with whom a battle begins does not match an identifier that is included in the battle history and that identifies an opponent against whom the user has won, determining the procedure for conducting the battle to be the first mode.

In the non-transitory computer readable recording medium according to the present invention, the battle history preferably further includes win-loss information on the user for each opponent with whom the user has battled, and the instructions preferably further cause the computer to perform the steps of: when the identifier of the opponent with whom the battle begins matches an identifier that is included in the battle history and that identifies an opponent against whom the user has won, calculating a predicted result of the battle in the second mode; and before determining the procedure for conducting the battle, causing the communication terminal to display information in accordance with the predicted result.

In the non-transitory computer readable recording medium according to the present invention, the instructions preferably further cause the computer to perform the step of: when the predicted result is more adverse for the user than a predetermined standard and the user has selected the second mode on the mode selection screen, causing the communication terminal to display a confirmation screen for the user to confirm selection of the second mode.

In the non-transitory computer readable recording medium according to the present invention, the instructions preferably further cause the computer to perform the steps of: when conducting the battle in the second mode, storing a battle log indicating content of the battle; and displaying a battle log screen to present the battle log to the user.

In the non-transitory computer readable recording medium according to the present invention, the instructions preferably further cause the computer to perform the steps of: when the user wins the battle, determining a winning reward in accordance with the procedure for conducting the battle; and providing the determined winning reward to the user.

A non-transitory computer readable recording medium according to the present invention is a non-transitory computer readable recording medium having stored thereon instructions to be executed on a computer providing a battle game to a communication terminal, the instructions causing the computer to perform the steps of: causing the communication terminal to display at least one of i) information in accordance with a battle result when a battle is conducted in a second mode for conducting the battle with fewer user operations than in a first mode for conducting the battle based on user operations, and ii) information indicating that an opponent is an opponent with whom a user has battled before; causing the communication terminal to display a mode selection screen allowing the user to select between the first mode and the second mode; determining a procedure for conducting the battle to be the first mode or the second mode in accordance with a user operation received via the mode selection screen; and conducting the battle with the determined procedure.

In the non-transitory computer readable recording medium according to the present invention, the instructions preferably further cause the computer to perform the step of: when the battle result for conducting the battle in the second mode is more adverse for the user than a predetermined standard and the user has selected the second mode on the mode selection screen, causing the communication terminal to display a confirmation screen for the user to confirm selection of the second mode.

In the non-transitory computer readable recording medium according to the present invention, the instructions preferably further cause the computer to perform the steps of: when conducting the battle in the second mode, storing a battle log indicating content of the battle; and displaying a battle log screen to present the battle log to the user.

In the non-transitory computer readable recording medium according to the present invention, the instructions preferably further cause the computer to perform the step of: when the user wins the battle, providing the user with a winning reward determined in accordance with the procedure for conducting the battle.

A game server according to the present invention is a game server for providing a battle game to a communication terminal, the game server comprising: a storage unit configured to store a battle history including an identifier of an opponent with whom a user has battled in the battle game; a procedure determination unit configured to determine, based on the battle history and on an identifier of an opponent with whom a battle begins, a procedure for conducting the battle in the battle game to be one of a first mode for conducting the battle based on user operations and a second mode for conducting the battle with fewer user operations than in the first mode; and a control unit configured to conduct the battle with the determined procedure.

A game server according to the present invention is a game server for providing a battle game to a communication terminal, the game server comprising: a server control unit configured to cause the communication terminal to display at least one of i) information in accordance with a battle result when a battle is conducted in a second mode for conducting the battle with fewer user operations than in a first mode for conducting the battle based on user operations, and ii) information indicating that an opponent is an opponent with whom a user has battled before, and to cause the communication terminal to display a mode selection screen allowing the user to select between the first mode and the second mode; and a procedure determination unit configured to determine a procedure for conducting the battle to be the first mode or the second mode in accordance with a user operation received via the mode selection screen, wherein the server control unit conducts the battle with the determined procedure.

A game control method according to the present invention is a game control method used in a game server for providing a battle game to a communication terminal, the game control method comprising the steps of: storing a battle history including an identifier of an opponent with whom a user has battled in the battle game; determining, based on the battle history and on an identifier of an opponent with whom a battle begins, a procedure for conducting the battle in the battle game to be one of a first mode for conducting the battle based on user operations and a second mode for conducting the battle with fewer user operations than in the first mode; and conducting the battle with the determined procedure.

A game control method according to the present invention is a game control method used in a game server for providing a battle game to a communication terminal, the game control method comprising the steps of: causing the communication terminal to display at least one of i) information in accordance with a battle result when a battle is conducted in a second mode for conducting the battle with fewer user operations than in a first mode for conducting the battle based on user operations, and ii) information indicating that an opponent is an opponent with whom a user has battled before; causing the communication terminal to display a mode selection screen allowing the user to select between the first mode and the second mode; determining a procedure for conducting the battle to be the first mode or the second mode in accordance with a user operation received via the mode selection screen; and conducting the battle with the determined procedure.

A game system according to the present invention is a game system comprising a communication terminal and a game server for providing a battle game to the communication terminal, the game server storing a battle history including an identifier of an opponent with whom a user has battled in the battle game; determining, based on the battle history and on an identifier of an opponent with whom a battle begins, a procedure for conducting the battle in the battle game to be one of a first mode for conducting the battle based on user operations and a second mode for conducting the battle with fewer user operations than in the first mode; and conducting the battle with the determined procedure.

A game system according to the present invention is a game system comprising a communication terminal and a game server for providing a battle game to the communication terminal, the game server causing the communication terminal to display at least one of i) information in accordance with a battle result when a battle is conducted in a second mode for conducting the battle with fewer user operations than in a first mode for conducting the battle based on user operations, and ii) information indicating that an opponent is an opponent with whom a user has battled before; causing the communication terminal to display a mode selection screen allowing the user to select between the first mode and the second mode; determining a procedure for conducting the battle to be the first mode or the second mode in accordance with a user operation received via the mode selection screen; and conducting the battle with the determined procedure.

Advantageous Effect of Invention

The non-transitory computer readable recording medium, game server, game control method, and game system according to the present invention can make the user operation in a battle game less troublesome.

BRIEF DESCRIPTION OF DRAWINGS

The present invention will be further described below with reference to the accompanying drawings, wherein:

FIGS. 2(a) and 2(b) illustrate an example of the user data in FIG. 1;

FIGS. 3(a) and 3(b) illustrate an example of the opponent database in FIG. 1;

FIG. 4 illustrates an example of the battle history in FIG. 1;

FIG. 5 illustrates an example of the battle log in FIG. 1;

FIGS. 6(a) and 6(b) illustrate an example of a mode selection screen according to an embodiment of the present invention;

DESCRIPTION OF EMBODIMENTS

The following describes an embodiment of the present invention.

Figure 1:
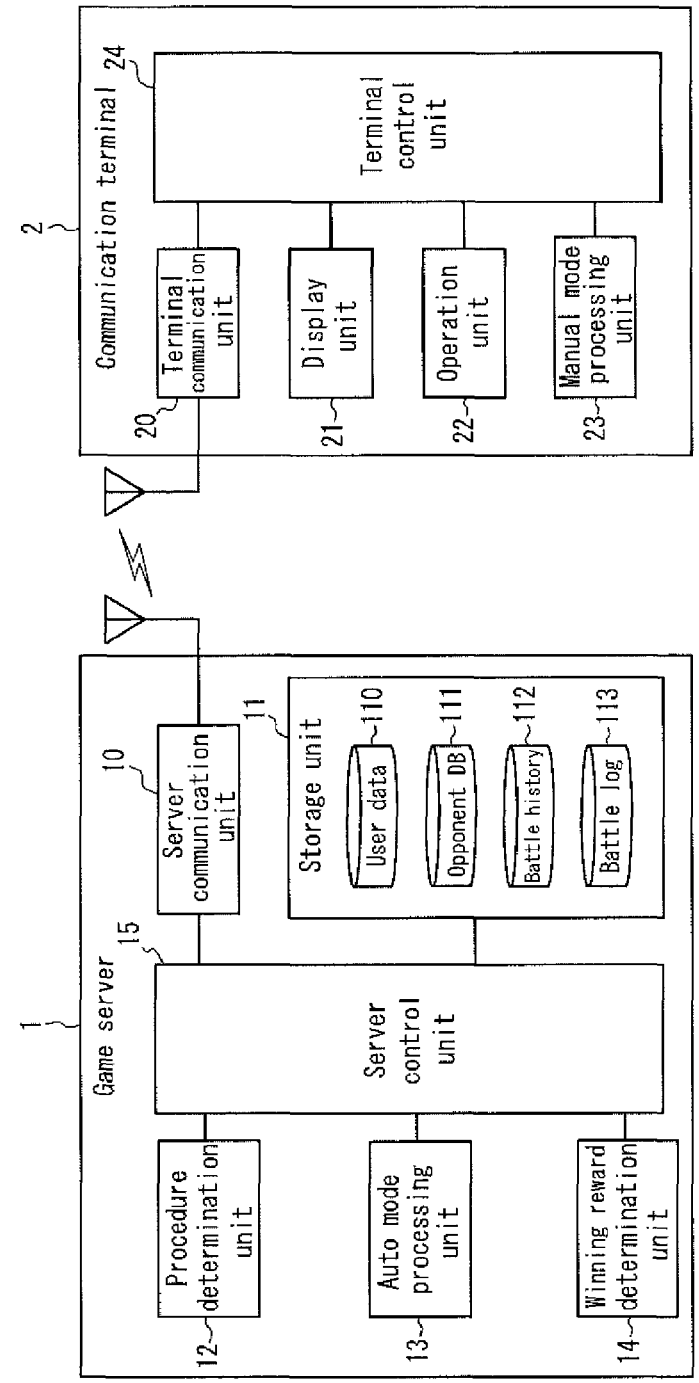
FIG. 1 is a block diagram of a game system according to an embodiment of the present invention.

FIG. 1 is a block diagram of a game system according to an embodiment of the present invention. The game system according to the present embodiment includes a game server 1 and a plurality of communication terminals 2. For the sake of simplicity, only one communication terminal 2 is illustrated in FIG. 1. The game server 1 transmits a battle game to the communication terminal 2. In the explanation below, a user in this game forms a deck from a maximum of 12 cards by combining cards within the game. Each card has a command determining an action of the player character controlled by the user. The user battles with an enemy character, i.e. an opponent, by selecting a card included in the deck as a command to determine the action of the player character. A battle takes place when a predetermined battle event occurs within the game, such as when the player character encounters an enemy.

The game server 1 includes a server communication unit 10, a storage unit 11, a procedure determination unit 12, an auto mode processing unit 13, a winning reward determination unit 14, and a server control unit 15.

The server communication unit 10 communicates with the communication terminal 2 over either or both of a wireless and wired connection.

The storage unit 11 stores user data 110, an opponent database (DB) 111, a battle history 112, and a battle log 113.

With reference to FIGS. 2(a) and 2(b), the user data 110 is described. The user data 110 (110a, 110b) is unique information for each user and includes a variety of information necessary to play the battle game.

As illustrated in FIG. 2(a), the user data 110a includes the parameters "level", "experience", "maximum deck cost", and "money" in association with a "user ID" that uniquely identifies a user. The user data 110a may also include information such as a list of cards or a list of game items held by the user.

The "user ID" may be a character string, a player character name that the user freely sets, or the like that can uniquely identify a user. The "level" is a parameter indicating the degree of development of the player character within the game. A higher numerical value for the level indicates a higher degree of development. "Experience" is a parameter that contributes to an increase in level and increases in accordance with progress in the game, battles, and the like. When experience reaches 100%, the level rises, and experience is reset to 0%. The "maximum deck cost" is a parameter contributing to the degree of freedom for forming the deck. As described below, a "cost" is set for each card, and the user must form the deck so that the total cost of all the cards in the deck is equal to or less than the maximum deck cost. Accordingly, the maximum deck cost is the maximum value of the total cost of cards that can be included in the deck. The maximum deck cost increases as the level rises. "Money" is a parameter indicating the amount of game currency that the user has. Money increases in accordance with progress in the game, battles, and the like.

The user data 110b includes information on the deck that the user has formed. As illustrated in FIG. 2(b), the user data 110b includes the following parameters for each card constituting the user's deck: "card ID", "level", "experience", "evolution", "cost", "HP", "ATK", "command ID", "command type", and "activation/recovery turns".

The "card ID" is information that can identify a card within the game and may be any character string, a character name depicted on the card, or the like that can uniquely identify a card. The "level" is a parameter indicating the degree of development of the card. A higher numerical value for the level indicates a higher degree of development. "Experience" is a parameter that contributes to an increase in level and increases in accordance with progress in the game, battles, and the like. "Evolution" is a parameter indicating the number of times that evolution is possible with a predetermined method such as synthesizing a card of the same type. "Evolution" is indicated as "current evolution level/final evolution level". For example, if "evolution" is "⅓", this indicates that evolution is possible two more times. "Cost" is a parameter indicating the cost necessary to include the card in the deck. "HP" is a parameter contributing to the hit points (HP) of the player character and increases in accordance with level and evolution. The maximum HP value for the player character is the total of the HP of each card in the deck. The player character's HP decreases when, for example, the player character is attacked by an opponent in a battle, and the player character loses the battle when HP reaches zero. "ATK" is a parameter contributing to the power of player character actions via commands such as attack, recover, and the like. The power of a command increases as the ATK value is higher. The "command ID" is information that can identify a command that a card has and may, for example, be any character string or any command name that can uniquely identify a command. The "command type" is information indicating the type of the corresponding command. For example, command types include "attack", which inflicts damage on an opponent, "recover", which recovers the player character's HP, "assist", which for example strengthens/weakens the player character/opponent, and the like. "Activation/recovery turns" is a parameter indicating the time required from when a card is selected at the start of the turn until the action due to the command is performed (number of turns to activation) and the time required from when the action due to the command is performed until the card can be selected again (number of turns to recovery). "Activation/recovery turns" is indicated as "number of turns to activation/number of turns to recovery". For example, if the user starts a turn by selecting "card001" that includes "cmd01" for which the "activation/recovery turns" is "½", the player character attacks the opponent with the command "cmd01" one turn after card selection, i.e. in the turn immediately after selection of the card. The user then cannot select "card001" again until two turns after selection of the card, i.e. until one more turn has passed after completion of the turn in which the player character attacks with the command "cmd01". Note that a turn is an opportunity for the player character and the opponent to act. At the start of a turn, the user selects a card to determine the action of the player character, and the turn progresses. When the player character and all of the opponents that can act in a turn have acted, or when there is no player character nor opponent who can act in the turn, then the turn finishes, and a new turn begins.

Next, with reference to FIGS. 3(*a*) and 3(*b*), the opponent database 111 is described. The opponent database 111 (111*a*, 111*b*) includes a variety of information related to the enemy characters that become opponents.

As illustrated in FIG. 3(*a*), the opponent database 111*a* includes the parameters "level", "HP", "ATK", "command ID", "command type", and "activation/recovery turns" in association with an "enemy character ID" that can uniquely identify an enemy character. Since these parameters are the same as the card parameters described for the user data 110*b*, a description thereof is omitted. An enemy character may have a plurality of commands, for example as "enemy002" does. When the enemy character has a plurality of commands, one of the commands is automatically selected, and the enemy character acts.

As illustrated in FIG. 3(*b*), the opponent database 111*b* includes combinations of enemy character IDs that appear as opponents in association with "opponent sets". Specifically, at the start of a battle in the game, one of the opponent sets is selected from the opponent database 111*b* to determine the opponent. For example, when "set01" is selected as the "opponent set", three of "enemy001" appear as opponents. In other words, the "opponent set" is an identifier indicating a combination of enemy characters that constitute the opponent(s).

Next, with reference to FIG. 4, the battle history 112 is described. The battle history 112 is information related to opponents with whom the user has battled in the past. Specifically, in association with a user ID, the battle history 112 includes "battled opponent sets", i.e. the opponent sets (identifiers) of opponents with whom the user has battled in the past, and includes win-loss information on the user for each battled opponent set. For example, in FIG. 4, "user001" has won against opponents corresponding to "set01" and "set02", and the win-loss information indicates "win". Furthermore, "user001" has not won against the opponent corresponding to "set03", and the win-loss information indicates "loss". Next, "user002" has won against the opponent corresponding to "set02", and the win-loss information indicates "win". On the other hand, "user002" has not won against the opponent corresponding to "set03", and the win-loss information indicates "loss". Furthermore, "user002" has not battled against the opponent corresponding to "set01", and hence "set01" is not included in the "battled opponent set".

Next, with reference to FIG. 5, the battle log 113 is described. The battle log 113 is information indicating the content of a battle when the battle is conducted in the below-described auto mode. Specifically, the battle log 113 includes a "turn number", "acting character", and "content of action". The battle log 113 may be temporarily stored in the storage unit 11 and erased after completion of the battle process.

The "turn number" indicates each turn that occurred from the start to the end of a battle. The "acting character" indicates the ID of each player character and enemy character that acted in the turn indicated by the turn number. The "content of action" indicates the result of the action taken by the corresponding acting character. For example, FIG. 5 shows that in the "first turn", "user001" attacked via "cmd01" and inflicted 1000 points of damage on "enemy001a". Note that FIG. 5 shows an example of the opponent being three of "enemy001", differentiated from each other by being listed as "enemy001a", "enemy001b", and "enemy001c".

The explanation now returns to FIG. 1. For each battle taking place in the game, the procedure determination unit 12 determines a procedure for conducting the battle to be either a manual mode (first mode) for conducting the battle based on user operations and an auto mode (second mode) for conducting the battle with fewer user operations than in the manual mode. Conducting the battle with fewer user operations than in the manual mode includes, for example, the cases of conducting the battle semi-automatically by omitting a portion of command selection by the user and conducting the battle automatically by omitting all command selection by the user. Specifically, at the start of a battle in the game, the procedure determination unit 12 looks up the opponent set selected as the opponent in the battle history 112. The procedure determination unit 12 judges whether the opponent set matches a battled opponent set, included in the battle history 112, for which the win-loss information is "win", i.e. whether the user has battled the opponent in the past and won. When the opponent set matches a battled opponent set for which the win-loss information is "win", i.e. when the user has won against the opponent in the past, then upon acquiring an input signal from the communication terminal 2, the procedure determination unit 12 determines the procedure for conducting the battle based on the input signal. The input signal is for a user operation that the communication terminal 2 has received on the below-described mode selection screen 3 or confirmation screen 4. On the other hand, when the opponent set does not match a battled opponent set for which the win-loss information is "win", i.e. when the user has not won against the opponent in the past, then the procedure determination unit 12 determines the procedure for conducting the battle to be the manual mode and transmits an instruction to the communication terminal 2 to conduct the battle in manual mode.

The auto mode processing unit 13 performs a battle process in auto mode. Specifically, the auto mode processing unit 13 automatically controls the player character, selecting cards and attacking the opponent in accordance with a predetermined process. One possible predetermined process is, for example, to use only the cards included in the deck for which the command type is attack and to attack in order starting with the first enemy character. Any other process, however may be used. For example, when the recovery turn becomes longer as the power of the command is higher, then the battle may be conducted by prioritizing use of cards having commands with a long recovery turn. Until the battle ends, i.e. until the HP of either every opponent or of the player character reaches zero, the auto mode processing unit 13 continues to attack and calculates the battle result. The battle result includes whether the battle was a win or a loss and the remaining HP of the player character. The auto mode processing unit 13 then stores the content of the battle in auto mode in the storage unit 11 as the battle log 113.

Before the communication terminal 2 is caused to display the below-described mode selection screen 3, i.e. before the user selects the procedure for conducting the battle, the auto mode processing unit 13 preferably performs the above-described process to calculate the battle result by auto mode as a predicted result. When the procedure determination unit 12 determines that the procedure for conducting the battle is auto mode, the auto mode processing unit 13 then determines the calculated predicted result to be the battle result of the battle.

When the player character wins the battle, the winning reward determination unit 14 determines a winning reward in the game and provides the winning reward to the user. Specifically, the winning reward determination unit 14 judges whether the user has won the battle based on the battle result calculated by the auto mode processing unit 13 or on the battle result acquired from the communication terminal 2. When the user has won the battle, the winning reward determination unit 14 then determines the winning reward by a predetermined method and provides the winning reward to user. The winning reward determination unit 14 preferably determines the winning reward in accordance with the procedure for conducting the battle. For example, the winning reward for a battle in manual mode may be selected from a reward group with a higher value than the winning reward for a battle in auto mode.

The server control unit 15 controls the various operations of the game server 1 and the overall conduction of the game.

The server control unit 15 also determines the opponent with whom the user battles. Specifically, at the start of a battle in the game, the server control unit 15 selects an opponent set from the opponent database 111*b* and determines the selected opponent set to be the opponent.

Via the server communication unit 10, the server control unit 15 transmits an instruction to the communication terminal 2 to display a variety of game screens. The variety of game screens include, for example, the below-described mode selection screen 3, confirmation screen 4, auto mode rendering screen 5, battle result screen 6, battle log screen 7, reward attainment screen 8, and manual mode battle screen 9.

The communication terminal 2 is provided with a terminal communication unit 20, a display unit 21, an operation unit 22, a manual mode processing unit 23, and a terminal control unit 24.

The terminal communication unit 20 communicates with the game server 1 over either or both of a wireless and wired connection.

The display unit 21 outputs display pertaining to the game provided by the game server 1. Specifically, the display unit 21 displays the below-described mode selection screen 3, confirmation screen 4, auto mode rendering screen 5, battle result screen 6, battle log screen 7, reward attainment screen 8, and manual mode battle screen 9. Any type of display device may be used in the display unit 21, such as a liquid crystal display, organic EL display, or the like.

The operation unit 22 receives user operations for the game. The operation unit 22 transmits an input signal in accordance with the received user operation to the terminal control unit 24. Any input interface may be used in the operation unit 22, such as a button, touch panel, or the like. In the following explanation, the operation unit 22 is assumed to be a touch panel.

The manual mode processing unit 23 performs a battle process in manual mode. Specifically, the manual mode processing unit 23 displays the below-described manual mode battle screen 9 on the display unit 21 and conducts the battle based on user operations. Once the battle ends, the manual mode processing unit 23 determines the battle result and transmits the battle result to the game server 1 via the terminal communication unit 20.

The terminal control unit 24 controls the various operations of the communication terminal 2. Also, upon acquiring an input signal from the operation unit 22 in accordance with a user operation received on one of the various screens displayed on the display unit 21, the terminal control unit 24 transmits the input signal to the game server 1 via the terminal communication unit 20.

Next, with reference to FIGS. 6(*a*) and 6(*b*), the mode selection screen 3 is described. The mode selection screen 3 is a screen for causing the user to select between the manual mode and the auto mode as the procedure for conducting the battle. At the start of a battle in the game, when the user has battled the opponent in the past, the mode selection screen 3 is displayed on the display unit 21 of the communication terminal 2.

Information in accordance with the predicted result of the battle calculated by the auto mode processing unit 13 of the game server 1 is preferably displayed on the mode selection screen 3. The information in accordance with the predicted result is information suggestive of the battle result when conducting the battle in auto mode. Specifically, as illustrated in FIG. 6(*a*), when the predicted result for example corresponds to "can win with remaining HP of at least 80% and less than 100%", then "You can easily win!" is the displayed information. On the other hand, if the predicted result corresponds to "can't win", then "This is quite a tough opponent . . . " is the displayed information.

As illustrated in FIG. 6(*b*), the mode selection screen 3 includes a character icon 30, message displaying area 31, manual button 32, and auto button 33.

The character icon 30 is the image of a character that presents the information displayed in the message displaying area 31 to the user.

The message displaying area 31 is an area displaying a comment encouraging the user to select a procedure for conducting the battle and displaying information in accordance with the predicted result of the battle. Specifically, when for example the predicted result is "can win with at least 80% and less than 100% of HP remaining", then "You've battled this enemy before, and you can win easily! Which way will you fight?" is displayed in the message displaying area 31.

The manual button 32 is an input interface that receives a user operation for selecting the manual mode as the procedure for conducting the battle. Once the user taps the manual button 32, the display switches to the below-described manual mode battle screen 9.

The auto button 33 is an input interface that receives a user operation for selecting the auto mode as the procedure for conducting the battle. Once the user taps the auto button 33, the display switches to the below-described confirmation screen 4 or auto mode rendering screen 5.

Figure 7:
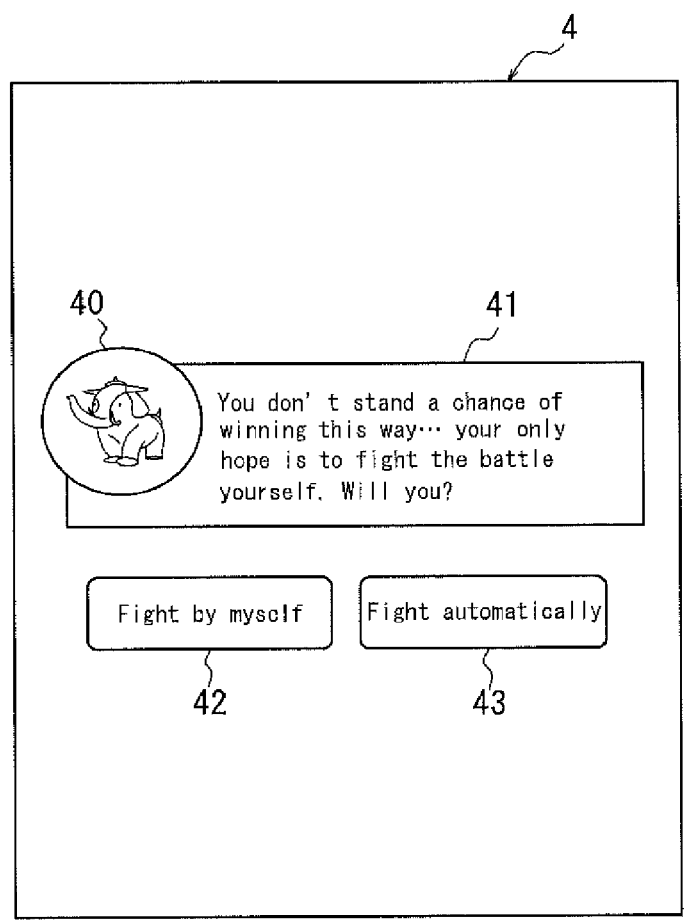
FIG. 7 illustrates an example of a confirmation screen according to an embodiment of the present invention.

Next, with reference to FIG. 7, the confirmation screen 4 is described. The confirmation screen 4 is a confirmation screen for the user to confirm selection of the auto mode on the mode selection screen 3. The confirmation screen 4 is displayed on the display unit 21 of the communication terminal 2 when the predicted result is more adverse for the user than a predetermined standard and the user has selected the auto mode on the mode selection screen 3. The predetermined standard may be set freely by the game provider or the like and may, for example, be a standard value relating to the remaining HP of the player character after the battle. In this case, a predicted result that is advantageous for the user indicates that the remaining HP is at least the standard value. Conversely, a predicted result that is adverse for the user indicates that the remaining HP is less than the standard value. In this way, for example by setting the predetermined standard to be "remaining HP 50%", the confirmation screen 4 is displayed when the remaining HP in the predicted result is less than 50% of the maximum HP and the user has selected auto mode on the mode selection screen 3.

As illustrated in FIG. 7, the confirmation screen 4 includes a character icon 40, a message displaying area 41, a manual button 42, and an auto button 43. Since the character icon 40, manual button 42, and auto button 43 are respectively similar to the character icon 30, manual button 32, and auto button 33 in the mode selection screen 3, a description thereof is omitted.

The message displaying area 41 is an area displaying a comment encouraging the user to confirm selection of auto mode on the mode selection screen 3 despite the fact that the predicted result is a battle result that is more adverse for the user than the predetermined standard. Specifically, "You don't stand a chance of winning this way . . . your only hope is to fight the battle yourself. Will you?" is displayed in the message displaying area 41.

Figure 8:
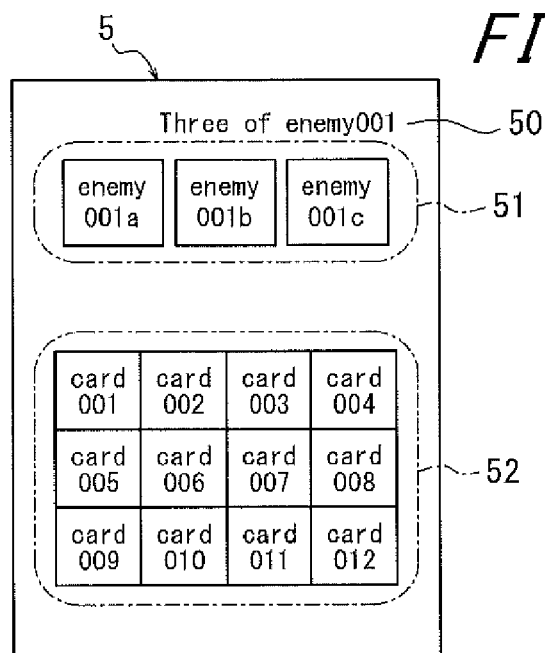
FIG. 8 illustrates an example of an auto mode rendering screen according to an embodiment of the present invention.

Next, with reference to FIG. 8, the auto mode rendering screen 5 is described. The auto mode rendering screen 5 is a screen presenting the user with a rendition of the battle in auto mode. The auto mode rendering screen 5 includes a displaying area 50 for the enemy character name, a displaying area 51 for enemy character images, and a displaying area 52 for the deck.

The displaying area 50 for the enemy character name is an area for displaying the enemy character ID of the enemy character that is the opponent and the number of that enemy character that appears. The displaying area 51 for enemy character images is an area for displaying the image of each enemy character that is the opponent. The displaying area 52 for the deck is an area for displaying images of the plurality of cards included in the user's deck. As a rendition of a battle in auto mode, the displaying area 52 for the deck moves towards the displaying area 51 for enemy character images. The displaying area 51 for enemy character images and the displaying area 52 for the deck then collide, and the entire screen turns white. Display then switches to the below-described battle result screen 6. As compared to the rendition of a battle with the below-described manual mode battle screen 9, the rendition of a battle with the auto mode rendering screen 5 has a shorter display time and is a simpler rendition. Hence, the processing load is smaller.

Figure 9:
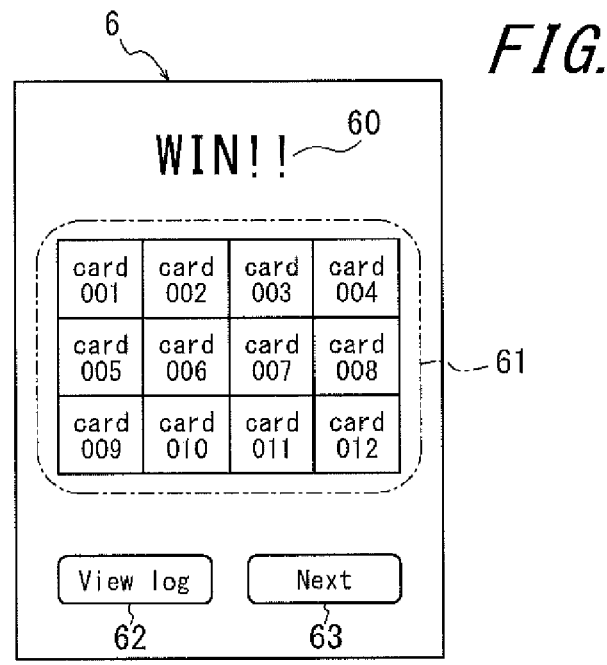
FIG. 9 illustrates an example of a battle result screen according to an embodiment of the present invention.

Next, with reference to FIG. 9, the battle result screen 6 is described. The battle result screen 6 is a screen presenting the user with the result of the battle in auto mode. The battle result screen 6 includes a displaying area 60 for the result, a displaying area 61 for the deck, a battle log button 62, and a next button 63. Since the displaying area 61 for the deck is similar to the displaying area 52 for the deck, a description thereof is omitted.

The displaying area 60 for the result is an area displaying whether the battle was won or lost. FIG. 9 shows an example in which the user won the battle, and "WIN!!" is displayed in the displaying area 60 for the result. Conversely, when the user loses the battle, for example "LOSE . . . " or the like may be displayed in the displaying area 60 for the result.

The battle log button 62 is an input interface for receiving a user operation to display the content of the battle in auto mode. Once the user taps the battle log button 62, the display switches to the below-described battle log screen 7.

The next button 63 is an input interface for receiving a user operation to switch from the battle result screen 6 to the next screen. Once the user taps the next button 63, the display switches to the below-described reward attainment screen 8.

Figure 10:
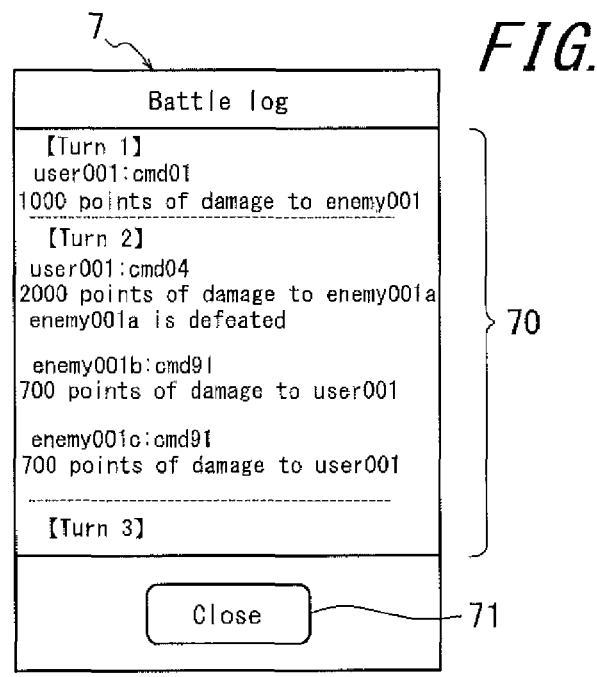
FIG. 10 illustrates an example of a battle log screen according to an embodiment of the present invention.

Next, with reference to FIG. 10, the battle log screen 7 is described. The battle log screen 7 is a screen presenting the user with the battle log 113 that indicates the content of the battle in auto mode. The battle log screen 7 includes a displaying area 70 for the battle log and a close button 71.

The displaying area 70 for the battle log is an area for displaying the battle log 113. By the user swiping the displaying area 70 for the battle log up and down, the entire battle log 113 can be displayed by scrolling.

The close button 71 is an input interface for receiving a user operation to terminate display of the battle log screen 7. Once the user taps the close button 71, the display switches to the battle result screen 6.

Figure 11:
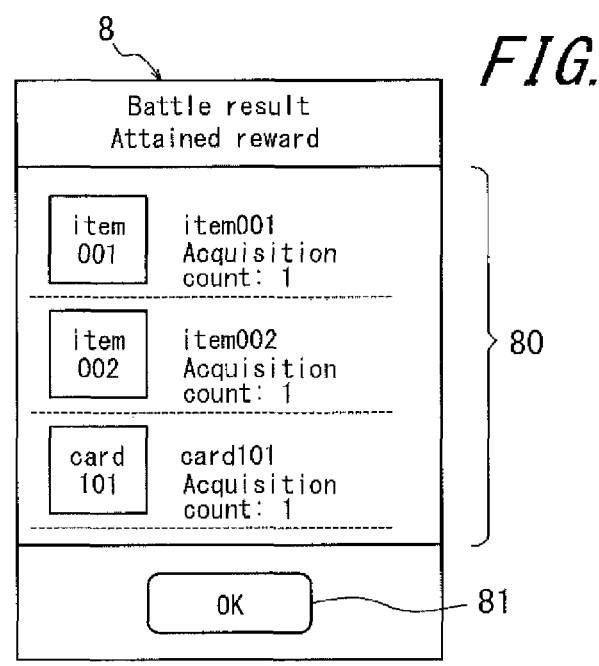
FIG. 11 illustrates an example of a reward attainment screen according to an embodiment of the present invention.

Next, with reference to FIG. 11, the reward attainment screen 8 is described. The reward attainment screen 8 is a screen presenting the user with the winning reward provided to the user when the user has won the battle. The reward attainment screen 8 includes a displaying area 80 for the reward and an OK button 81.

The displaying area 80 for the reward is an area for displaying information related to the winning reward provided to the user. The information related to the winning reward includes, for example, an image of the game card or item that is the reward, a card ID or an item ID that can identify an item, and an acquisition count. By the user swiping the displaying area 80 for the reward up and down, the information relating to all of the winning rewards can be displayed by scrolling.

The OK button 81 is an input interface for receiving a user operation to terminate the battle process. Once the user taps the OK button 81, the battle process terminates, and the display switches for example to the screen immediately before the start of a battle.

Figure 12:
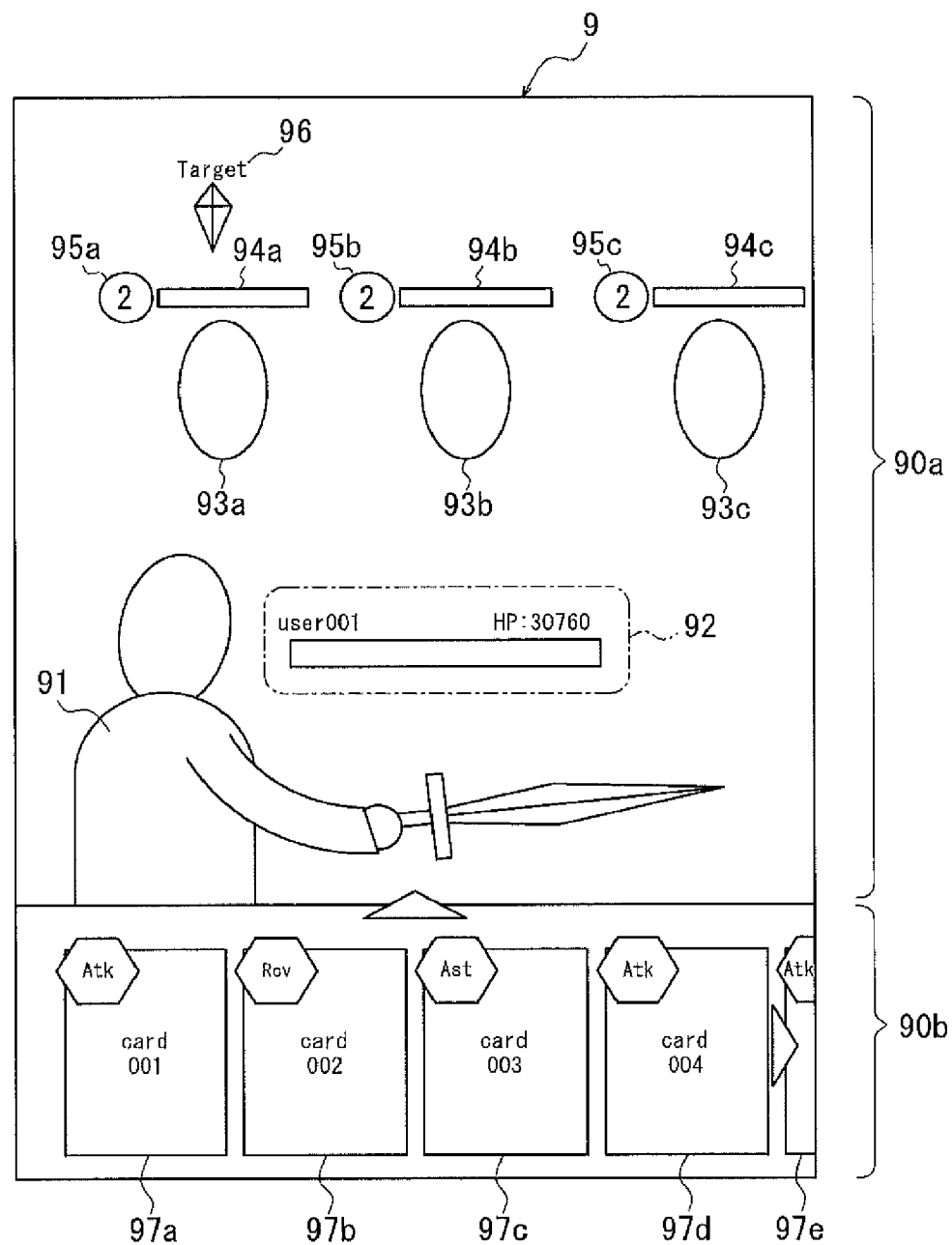
FIG. 12 illustrates an example of a manual mode battle screen according to an embodiment of the present invention.

Next, with reference to FIG. 12, the manual mode battle screen 9 is described. The manual mode battle screen 9 is a screen for fighting a battle in manual mode. The manual mode battle screen 9 includes i) a field area 90a displaying a player character 91, a displaying area 92 for player status, an enemy character 93 (93a, 93b, 93c), an enemy HP indicator 94 (94a, 94b, 94c), a number of enemy wait turns 95 (95a, 95b, 95c), and a target icon 96, and ii) a displaying area 90b for the deck in which cards 97 (97a, 97b, 97c, 97d, 97e) are displayed. FIG. 12 illustrates the state immediately before the start of a turn, i.e. the state of waiting for a user operation to determine the action of the player character 91.

The field area 90a is an area for displaying graphics such as the player character 91. The turn progresses once the user determines the action of the player character 91, and a rendition is provided in the field area 90a in accordance with the action of the player character 91 and the like.

The player character 91 is a 2D or 3D graphic representing the player character that the user controls. The displaying area 92 for player status displays the remaining HP of the player character 91 numerically and with an indicator.

Each enemy character 93 (93a, 93b, 93c) is a 2D or 3D graphic representing an enemy character that is the opponent. Each enemy HP indicator 94 (94a, 94b, 94c) indicates the remaining HP of the corresponding enemy character 93. The number of enemy wait turns 95 (95a, 95b, 95c) indicates the number of turns until the corresponding enemy character 93 acts next. The target icon 96 indicates the target that the player character 91 is attacking. The user can change the attack target by tapping an enemy character 93.

The displaying area 90b for the deck is an area for displaying cards 97 included in the user's deck. By the user swiping the displaying area 90b for the deck to the left and right, the card 97 of every card included in the deck can be displayed. The displaying area 90b for the deck can preferably be minimized towards the bottom of the display screen. In this case, the entire manual mode battle screen 9 becomes the field area 90a.

Each card 97 is displayed as a combination of a card image and an image indicating the command type of the command that the card has. At the start of each turn, the user selects one card from among selectable cards 97 to determine the action of the player character 91. For example, in the state illustrated in FIG. 12, the card 97a is selected if the user drags the card 97a from the displaying area 90b for the deck into the field area 90a. The player character 91 then attacks the enemy character 93a with the command that the selected card 97a has. When a user cannot select a card 97, such as during rendition of the battle, it is preferably made clear that the user cannot tap the cards 97 for example by darkening display of the cards 97.

Figure 13:
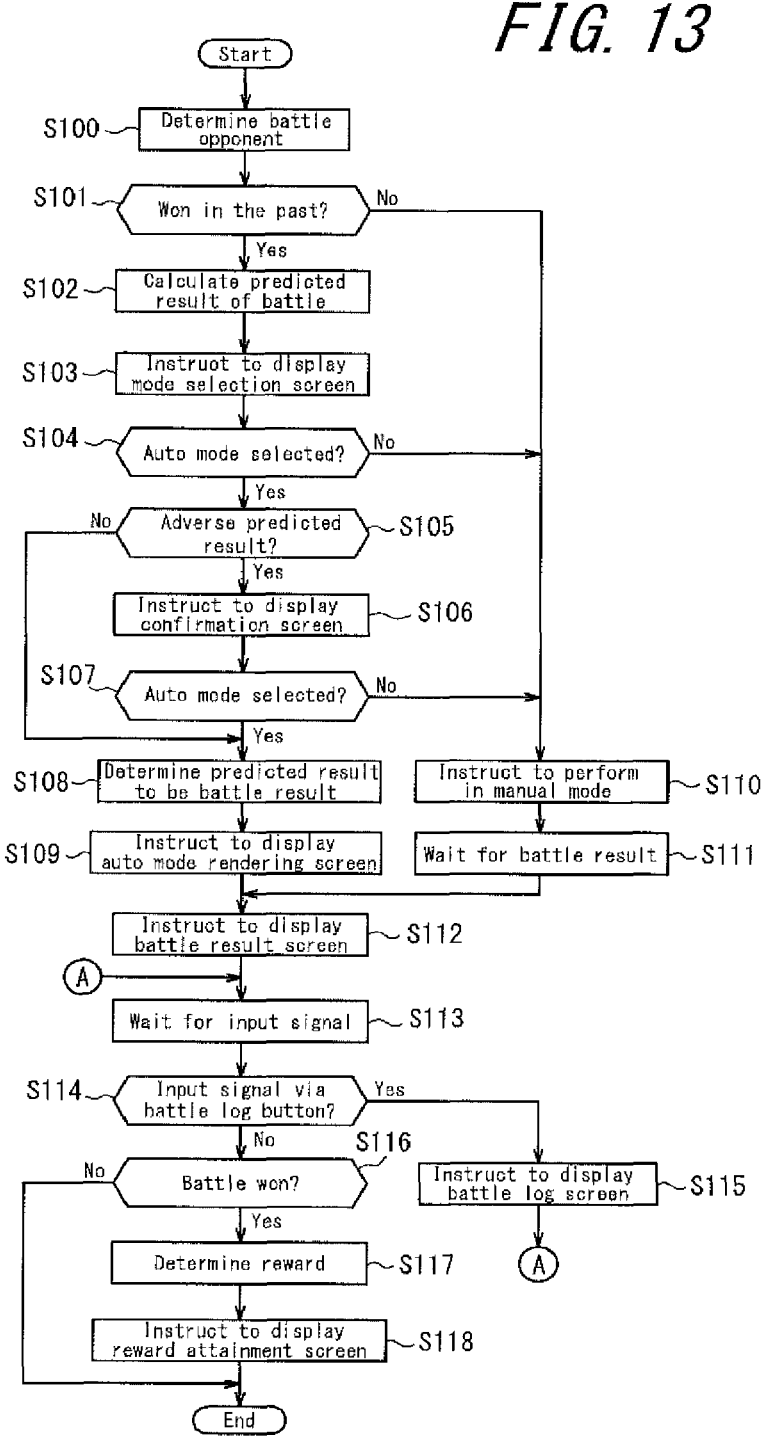
FIG. 13 is a flowchart illustrating operations of a game server according to an embodiment of the present invention.

Next, with reference to FIG. 13, operations of the game server 1 according to the present embodiment are described. The flowchart in FIG. 13 illustrates operations for a battle process performed by the game server 1. This process begins when a predetermined battle event occurs, such as when the player character encounters an enemy.

First, the server control unit 15 determines the opponent with whom the user battles (step S100). Specifically, the server control unit 15 selects an opponent set from the opponent database 111b and determines the selected opponent set to be the opponent.

Next, the procedure determination unit 12 judges whether the user has battled the opponent determined in step S100 in the past and won (step S101). Specifically, the procedure determination unit 12 looks up the opponent set determined in step S100 in the battle history 112. When the opponent set matches a battled opponent set that is included in the battle history 112 and for which the win-loss information is "win", the procedure determination unit 12 judges that the user has won in the past (step S101: Yes), and the process proceeds to step S102. Conversely, when the opponent set does not match a battled opponent set that is included in the battle history 112 and for which the win-loss information is "win", the procedure determination unit 12 judges that the user has not battled and won in the past (step S101: No), and the process proceeds to step S110.

In step S101, when determining that the user has won in the past (step S101: Yes), the auto mode processing unit 13 calculates the predicted result of the battle in auto mode (step S102).

Next, the server control unit 15 transmits an instruction to the communication terminal 2 to display the mode selection screen 3 (step S103).

Next, upon receiving from the communication terminal 2 an input signal for a user operation received on the mode selection screen 3, the procedure determination unit 12 judges whether auto mode has been selected based on the input signal (step S104). When auto mode has been selected (step S104: Yes), the process proceeds to step S105. Conversely, when manual mode has been selected (step S104: No), the process proceeds to step S110.

When auto mode has been selected in step S104 (step S104: Yes), the server control unit 15 judges whether the predicted result of the battle calculated in step S102 is more adverse for the user than a predetermined standard (step S105). When the predicted result is more adverse than the predetermined standard (step S105: Yes), the process proceeds to step S106. Conversely, when the predicted result is at least the predetermined standard (step S105: No), the process proceeds to step S108.

When the predicted result is more adverse than the predetermined standard in step S105 (step S105: Yes), the server control unit 15 transmits an instruction to the communication terminal 2 to display the confirmation screen 4 (step S106).

Next, upon receiving from the communication terminal 2 an input signal for a user operation received on the confirmation screen 4, the procedure determination unit 12 judges whether auto mode has been selected based on the input signal (step S107). When auto mode has been selected (step S107: Yes), the process proceeds to step S108. Conversely, when manual mode has been selected (step S107: No), the process proceeds to step S110.

When the predicted result is at least the predetermined standard in step S105 (step S105: No), or when auto mode has been selected in step S107 (step S107: Yes), the auto mode processing unit 13 determines the predicted result calculated in step S102 to be the battle result of the battle (step S108).

Next, the server control unit 15 transmits an instruction to the communication terminal 2 to display the auto mode rendering screen 5 (step S109).

Conversely, when judging in step S101 that the user has not won in the past (step S101: No) or when manual mode is selected in step S104 or step S107 (step S104: No, step S107: No), the procedure determination unit 12 determines the procedure for conducting the battle to be manual mode and transmits an instruction to the communication terminal 2 to execute a battle process in manual mode (step S110).

After step S110, the server control unit 15 waits until acquiring the battle result for manual mode from the communication terminal 2 (step S111), and upon acquisition of the battle result, the process proceeds to step S112.

After step S109 or step S111, the server control unit 15 transmits an instruction to the communication terminal 2 to display the battle result screen 6 (step S112).

Next, the server control unit 15 waits until acquiring from the communication terminal 2 an input signal for a user operation received by the communication terminal 2 on the battle result screen 6 (step S113).

Upon acquiring the input signal in step S113, the server control unit 15 then judges whether the input signal is an input signal via the battle log button 62 (step S114). When the input signal is an input signal via the battle log button 62 (step S114: Yes), the process proceeds to step S115. On the other hand, when the input signal is an input signal via the next button 63 (step S114: No), the process proceeds to step S116.

When the input signal in step S114 is an input signal via the battle log button 62 (step S114: Yes), the server control unit 15 transmits to the communication terminal 2 an instruction to display the battle log screen 7 (step S115). The process then returns to step S113 and continues.

On the other hand, when the input signal in step S114 is an input signal via the next button 63 (step S114: No), the winning reward determination unit 14 judges whether the user has won the battle based on the battle result determined by the auto mode processing unit 13 in step S108 (step S116). When the user has won (step S116: Yes), the process proceeds to step S117. Conversely, when the user has lost (step S116: No), the present process terminates.

When the user has won in step S116 (step S116: Yes), the winning reward determination unit 14 determines a winning reward and provides the winning reward to the user (step S117). The winning reward determination unit 14 preferably determines the winning reward in accordance with the procedure for conducting the battle.

The server control unit 15 then transmits an instruction to the communication terminal 2 to display the reward attainment screen 8 (step S118), and the process terminates.

Figure 14:
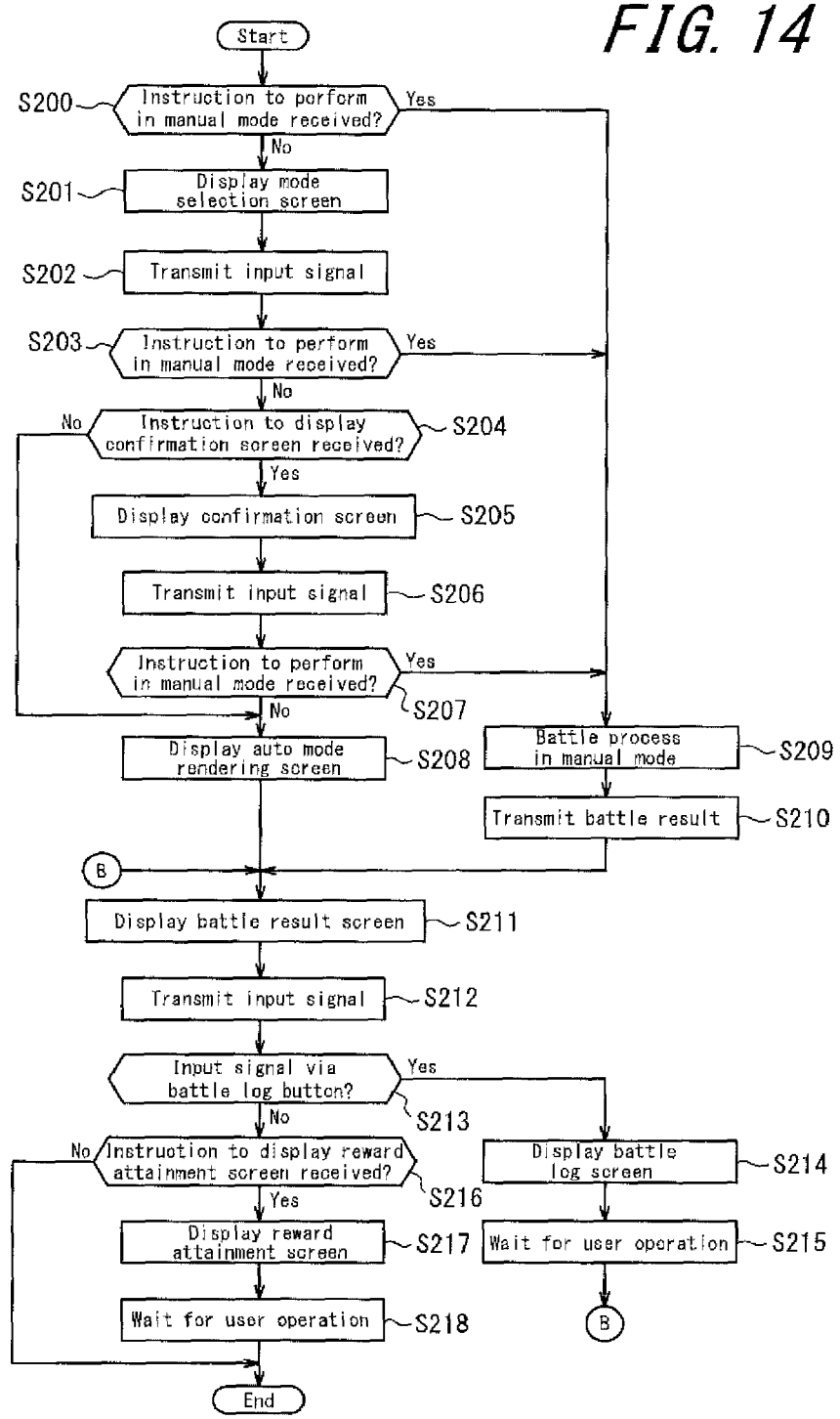
FIG. 14 is a flowchart illustrating operations of a communication terminal according to an embodiment of the present invention.

Next, with reference to FIG. 14, operations of the communication terminal 2 according to the present embodiment are described. The flowchart in FIG. 14 illustrates operations for a battle process performed by the communication terminal 2. This process begins when a predetermined battle event occurs, such as when the player character encounters an enemy.

First, the terminal control unit 24 waits for an instruction from the game server 1 and judges whether an instruction to execute a battle process in manual mode has been received (step S200). When an instruction for manual mode has been received (step S200: Yes), the process proceeds to step S209. Conversely, when an instruction for manual mode has not been received (step S200: No), the process proceeds to step S201.

When an instruction for manual mode has not been received in step S200 (step S200: No), the terminal control unit 24 receives an instruction to display the mode selection screen 3 from the game server 1 and displays the mode selection screen 3 on the display unit 21 (step S201).

Next, upon acquiring from the operation unit 22 an input signal for a user operation received on the mode selection screen 3, the terminal control unit 24 transmits the input signal to the game server 1 (step S202).

The terminal control unit 24 then waits for an instruction from the game server 1 and judges whether an instruction to execute a battle process in manual mode has been received (step S203). When an instruction for manual mode has not been received (step S203: No), the process proceeds to step S204. Conversely, when an instruction for manual mode has been received (step S203: Yes), the process proceeds to step S209.

When an instruction for manual mode has not been received in step S203 (step S203: No), the terminal control unit 24 waits for an instruction from the game server 1 and judges whether an instruction to display the confirmation screen 4 has been received (step S204). When an instruction to display the confirmation screen 4 has been received (step S204: Yes), the process proceeds to step S205. Conversely, when an instruction to display the confirmation screen 4 has not been received (step S204: No), the process proceeds to step S208.

When an instruction to display the confirmation screen 4 has been received in step S204 (step S204: Yes), the terminal control unit 24 displays the confirmation screen 4 on the display unit 21 (step S205).

Next, upon acquiring from the operation unit 22 an input signal for a user operation received on the confirmation screen 4, the terminal control unit 24 transmits the input signal to the game server 1 (step S206).

The terminal control unit 24 then waits for an instruction from the game server 1 and judges whether an instruction to execute a battle process in manual mode has been received (step S207). When an instruction for manual mode has not been received (step S207: No), the process proceeds to step S208. Conversely, when an instruction for manual mode has been received (step S207: Yes), the process proceeds to step S209.

When an instruction for manual mode has not been received in step S207 (step S207: No), then upon receiving an instruction to display the auto mode rendering screen 5 from the game server 1, the terminal control unit 24 displays the auto mode rendering screen 5 on the display unit 21 (step S208).

Conversely, when an instruction for manual mode has been received in step S200, step S203, or step S207 (step S200: Yes, step S203: Yes, step S207: Yes), the manual mode processing unit 23 performs a battle process in manual mode (step S209).

Next, once the battle ends, the manual mode processing unit 23 determines the battle result and transmits the battle result to the game server 1 (step S210).

After step S208 or step S210, upon receiving an instruction to display the battle result screen 6 from the game server 1, the terminal control unit 24 displays the battle result screen 6 on the display unit 21 (step S211).

Next, upon acquiring from the operation unit 22 an input signal for a user operation received on the battle result screen 6, the terminal control unit 24 transmits the input signal to the game server 1 (step S212).

The terminal control unit 24 then judges whether the input signal acquired in step S212 is an input signal via the battle log button 62 (step S213). When the input signal is an input signal via the battle log button 62 (step 213: Yes), the process proceeds to step S214. On the other hand, when the input signal is an input signal via the next button 63 (step S213: No), the process proceeds to step S216.

When the input signal in step S213 is an input signal via the battle log button 62 (step S213: Yes), then upon receiving an instruction to display the battle log screen 7 from the game server 1, the terminal control unit 24 displays the battle log screen 7 on the display unit 21 (step S214).

Next, the terminal control unit 24 waits for a user operation on the battle log screen 7 (step S215), and upon receipt of an input signal via the close button 71 from the operation unit 22, the process returns to step S211 and continues.

On the other hand, when the input signal in step S213 is an input signal via the next button 63 (step S213: No), the terminal control unit 24 waits for an instruction from the game server 1 and judges whether an instruction to display the reward attainment screen 8 has been received (step S216). When an instruction to display the reward attainment screen 8 has been received (step S216: Yes), the process proceeds to step S217. Conversely, when an instruction to display the reward attainment screen 8 has not been received (step S216: No), the process terminates.

When an instruction to display the reward attainment screen 8 has been received in step S216 (step S216: Yes), the terminal control unit 24 displays the reward attainment screen 8 on the display unit 21 (step S217).

The terminal control unit 24 then waits for a user operation on the reward attainment screen 8 (step S218), and upon receipt of an input signal via the OK button 81 from the operation unit 22, the process terminates.

As described above, according to the present embodiment, a battle history 112 that includes identifiers (opponent sets) of opponents with whom the user has battled is stored. Based on the battle history 112 and on the identifier of the opponent with whom a battle begins, a procedure for conducting the battle in the battle game is determined to be either manual mode or auto mode, and the battle is conducted with the determined procedure. It is hence possible to change the procedure for conducting the battle in accordance with the user's past battle experience. While maintaining the gaming aspect of a battle in manual mode, user operation can be made less troublesome during a battle in auto mode. Furthermore, the user can efficiently battle in a short period of time in auto mode, thereby improving the user's experience.

According to the present embodiment, when the identifier of the opponent with whom the battle begins matches the identifier of an opponent included in the battle history 112, the mode selection screen 3 allowing the user to select either manual mode or auto mode is displayed. Conversely, when the identifier of the opponent with whom the battle begins does not match the identifier of an opponent included in the battle history 112, the procedure for conducting the battle is determined to be manual mode. In this way, the gaming aspect of a battle in manual mode for an opponent that the user is battling for the first time can be maintained. At the same time, when the user has already battled an opponent and hence is highly likely to have lost interest, the user can choose to battle using an easy operation in auto mode, thereby improving the user's experience. The identifier of the opponent may be the individual enemy character IDs of the opponents or the opponent set that indicates a combination of opponents. For example, as in the above-described embodiment, using the opponent set as the identifier of the opponent allows for maintenance of the gaming aspect in manual mode even when the user has already won against the individual enemy characters, since the level of battle difficulty or the like varies due to a different number or combination of enemy characters.

According to the present embodiment, the battle history 112 may further include win-loss information on the user for each opponent with whom the user has battled, and when the identifier of the opponent with whom the battle begins matches an identifier that is included in the battle history 112 and that identifies an opponent against whom the user has won, the mode selection screen 3 may be displayed. In this way, for an opponent against whom the user has won in the past, i.e. an opponent against whom the user is highly likely to win in a new battle, the user can choose to battle using an easy operation in auto mode, thereby improving the user's experience.

According to the present embodiment, the auto mode processing unit 13 calculates the predicted result of the battle in auto mode, and before determining the procedure for conducting the battle, displays information corresponding to the predicted result on the display unit 21. In this way, by suggesting the battle result in auto mode to the user, the user can decide which procedure for conducting the battle to select based on the suggestion.

According to the present embodiment, when the predicted result is more adverse for the user than a predetermined standard and the user has selected auto mode on the mode selection screen 3, the confirmation screen 4 for the user to confirm selection of auto mode is displayed. It is thus possible to reduce the chance of an unintended adverse result, as when the user selects auto mode due to an erroneous operation or the like on the mode selection screen 3.

According to the present embodiment, when conducting the battle in auto mode, the battle log 113 indicating the content of the battle is stored, and the battle log screen 7 for presenting the battle log 113 to the user is displayed. Even for a battle in auto mode, the user can therefore confirm the content of the battle, thus increasing the user's degree of satisfaction.

According to the present embodiment, the winning reward is determined in accordance with the procedure for conducting the battle, and the determined winning reward is provided to the user. For example, the winning reward for a battle in manual mode is selected from a reward group with a higher value than the winning reward for a battle in auto mode. By thus encouraging the user to battle in manual mode, for which the gaming aspect is greater, the user's interest in the game can be enhanced.

Although the present invention has been described based on drawings and examples, it is to be noted that various changes and modifications will be apparent to those skilled in the art based on the present disclosure. Therefore, such changes and modifications are to be understood as included within the scope of the present invention. For example, the functions and the like included in the various units and steps may be reordered in any logically consistent way. Furthermore, units or steps may be combined into one or divided.

For example, the determination of whether to display the mode selection screen 3 may be made based on any information related to the opponent. Specifically, the mode selection screen 3 may be displayed when the player character's level is at least a predetermined value higher than the level of the enemy character that is the opponent.

Furthermore, the opponent is not limited to being an enemy character and may be the player character of another user or the like.

Another example is how, when the user wins a battle in manual mode with a result more advantageous for the user than the predicted result of the battle in auto mode, the winning reward may be selected from a reward group with an even higher value than the normal winning reward for manual mode. The user is thus encouraged to consider battle strategy in manual mode, thereby enhancing the user's interest in the game.

Yet another example is that the above-described processes performed by the game server 1 or the communication terminal 2 may be performed in cooperation by the game server 1 and the communication terminal 2. For example, for a process to cause the communication terminal 2 to display a game screen, one possible configuration is for a portion of the screen (such as the portion displaying an image in accordance with game progress) to be a web display that is displayed based on data generated by the game server 1, and another portion (such as the portion displaying a menu or other fixed input interface) to be a native display via a native application installed on the communication terminal 2.

REFERENCE SIGNS LIST

1: Game server
2: Communication terminal
3: Mode selection screen
4: Confirmation screen
5: Auto mode rendering screen
6: Battle result screen
7: Battle log screen
8: Reward attainment screen
9: Manual mode battle screen
10: Server communication unit
11: Storage unit
110, 110a, 110b: User data
111, 111a, 111b: Opponent database (DB)
112: Battle history
113: Battle log
12: Procedure determination unit
13: Auto mode processing unit
14: Winning reward determination unit
15: Server control unit
20: Terminal communication unit
21: Display unit
22: Operation unit
23: Manual mode processing unit
24: Terminal control unit
30: Character icon
31: Message displaying area
32: Manual button
33: Auto button
40: Character icon
41: Message displaying area
42: Manual button
43: Auto button
50: Displaying area for the enemy character name
51: Displaying area for enemy character images
52: Displaying area for the deck
60: Displaying area for the result
61: Displaying area for the deck
62: Battle log button
63: Next button
70: Displaying area for the battle log
71: Close button
80: Displaying area for the reward
81: OK button
90a: Field area
90b: Displaying area for the deck
91: Player character
92: Displaying area for player status
93, 93a, 93b, 93c: Enemy character
94, 94a, 94b, 94c: Enemy HP indicator
95, 95a, 95b, 95c: Number of enemy wait turns
96: Target icon
97, 97a, 97b, 97c, 97d, 97e: Card

The invention claimed is:

1. A system for processing a game, the system comprising:
   a communication terminal; and
   a sever configured to communicate with the communication terminal;
   wherein:
      the server is configured to:
         determine an opponent for a user of the communication terminal to battle in the game;
         determine, based on battle history information of the user, whether the user has battled with the determined opponent in the past;
         responsive to determining that the user has battled with the opponent in the past, automatically execute a battle using a parameter associated with the user and a parameter associated with the opponent to obtain a predicted result of the battle;
         transmit, to the communication terminal, first information for display of a selection view for the user to select one of a first mode that advances the battle according to a first number of user operations and a second mode that advances the battle according to a second number of user operations that is less than the first number;
         transmit, to the communication terminal, second information to advance the battle in the selected mode; and
         responsive to a result of the battle in the first mode being more advantageous for the user than the predicted result, associate a first reward having a first value in the game with the user, the first value being higher than a second value of a second reward;
         responsive to a result of the battle in the first mode being less advantageous for the user than the predicted result, associate the second reward with the user; and
      the communication terminal is configured to:
         display the selection view on a display based on the first information;
         transmit, to the server, identification information that indicates the selected mode; and
         display a game execution view based on the second information.

2. The system according to claim 1, wherein the server is further configured to select the first reward from rewards having values higher than the second value.

3. The system according to claim 1, wherein:
   the server is configured to, responsive to (i) the predicted result being less advantageous for the user than a predetermined standard, and (ii) determining that the user selects the second mode, transmit, to the communication terminal, third information for display of a confirmation view that indicates the second mode is selected; and
   the communication terminal is configured to display the confirmation view on the display based on the third information.

4. The system according to claim 1, wherein the communication terminal is configured to, responsive to a level of the user being higher than a level of the opponent by a predetermined value or more, display the selection view on the display.

5. The system according to claim 1, wherein the communication terminal is configured to, upon a determination that the game is advanced in the second mode, display a battle log view on the display that indicates content of the battle.

6. The system according to claim 1, wherein the communication terminal is configured to:
   responsive to a new opponent selected when the battle starts matching an opponent in past battles, display the selection view on the display; and
   responsive to the new opponent not matching any of opponents in the past battles, advance the game in the first mode.

7. A method for processing a game, the method comprising:
   by a sever configured to communicate with a communication terminal:

determining an opponent for a user of the communication terminal to battle in the game;
determining, based on battle history information of the user, whether the user has battled with the determined opponent in the past;
responsive to determining that the user has battled with the opponent in the past, automatically executing a battle using a parameter associated with the user and a parameter associated with the opponent to obtain a predicted result of the battle;
transmitting, to the communication terminal, first information for display of a selection view for the user to select one of a first mode that advances the battle according to a first number of user operations and a second mode that advances the battle according to a second number of user operations that is less than the first number;
transmitting, to the communication terminal, second information to advance the battle in the selected mode;
responsive to a result of the battle in the first mode being more advantageous for the user than the predicted result, associating a first reward having a first value in the game with the user, the first value being higher than a second value of a second reward;
responsive to a result of the battle in the first mode being less advantageous for the user than the predicted result, associating the second reward with the user;
by the communication terminal:
displaying the selection view on a display of the communication terminal based on the first information;
transmitting, to the server, identification information that indicates the selected mode; and
displaying a game execution view based on the second information.

8. The method according to claim 7, further comprising: the server selecting the first reward from rewards having values higher than the second value.

9. The method according to claim 7, further comprising:
responsive to (i) the predicted result being less advantageous for the user than a predetermined standard, and (ii) determining that the user selects the second mode, transmitting from the server to the communication terminal, third information for display of a confirmation view that indicates the second mode is selected; and
displaying on the display of the communication terminal the confirmation view on the display based on the third information.

10. The method according to claim 7, further comprising:
responsive to a level of the user being higher than a level of the opponent by a predetermined value or more, displaying the selection view on the display of the communication terminal.

11. The method according to claim 7, further comprising:
upon a determination that the game is advanced in the second mode, displaying a battle log view on the display of the communication terminal that indicates content of the battle.

12. The method according to claim 7, further comprising:
responsive to a new opponent selected when the battle starts matching an opponent in past battles, displaying the selection view on the display of the communication terminal; and
responsive to the new opponent not matching any of opponents in the past battles, the communication terminal advancing the game in the first mode.

13. A method for processing a game in a communication terminal configured to communicate with a server, the method comprising:
displaying, on a display of the communication terminal, a selection view for a user of the communication terminal to select one of a first mode that advances a battle in the game according to a first number of user operations and a second mode that advances the battle according to a second number of user operations that is less than the first number;
transmitting, from the communication terminal to the server, identification information that indicates a selected mode that is selected on the selection view;
displaying a game execution view on the display of the communication terminal based on information for advancing the game in the selected mode; and
responsive to (i) the user having battled with an opponent of the battle in a past battle, and (ii) a result of the battle in the first mode being more advantageous for the user than a predicted result, the communication terminal presenting a first reward having a first value in the game to the user, the predicted result being a result of the battle automatically executed using a parameter associated with the user and a parameter associated with the opponent, the first value being higher than a second value of a second reward; and
responsive to a result of the battle in the first mode being less advantageous for the user than the predicted result, the communication terminal presenting the second reward to the user.

14. The method according to claim 13, wherein the first reward is selected by the server from rewards having values higher than the second value.

15. The method according to claim 13, further comprising:
responsive to (i) the predicted result being less advantageous for the user than a predetermined standard, and (ii) determining that the user selects the second mode, displaying a confirmation view that indicates the second mode is selected by the user on the display of the communication terminal.

16. The method according to claim 13, further comprising:
responsive to a level of the user being higher than a level of the opponent by a predetermined value or more, displaying the selection view on the display of the communication terminal.

17. The method according to claim 13, further comprising:
in an case the game is advanced in the second mode, displaying a battle log view on the display of the communication terminal that indicates content of the battle.

18. The method according to claim 13, further comprising:
responsive to a new opponent selected when the battle starts matching an opponent in past battles, displaying the selection view on the display of the communication terminal; and
responsive to the new opponent not matching any of opponents in the past battles, the communication terminal advancing the game in the first mode.

* * * * *